United States Patent [19]
Rahgozar et al.

[11] Patent Number: 5,841,900
[45] Date of Patent: Nov. 24, 1998

[54] METHOD FOR GRAPH-BASED TABLE RECOGNITION

[75] Inventors: M. Armon Rahgozar, Penfield, N.Y.; Robert Cooperman, Somerville, Mass.

[73] Assignee: Xerox Corporation, Stamford, Conn.

[21] Appl. No.: 585,142

[22] Filed: Jan. 11, 1996

[51] Int. Cl.$^6$ .................................................. G06K 9/34
[52] U.S. Cl. ...................... 382/176; 382/180; 707/509; 707/517
[58] Field of Search .................................. 382/202, 177, 382/176, 180, 306; 395/779, 770, 782, 774, 776; 707/517, 509, 520, 513, 514

[56] References Cited

U.S. PATENT DOCUMENTS

| | | | |
|---|---|---|---|
| 5,159,667 | 10/1992 | Borrey et al. | 395/761 |
| 5,438,512 | 8/1995 | Mantha et al. | 395/779 |
| 5,465,304 | 11/1995 | Cullen et al. | 382/176 |
| 5,475,805 | 12/1995 | Murata | 395/774 |
| 5,555,362 | 9/1996 | Yamashita et al. | 395/145 |

OTHER PUBLICATIONS

Tsuji. "Document Image Analysis for Generating Syntactic Structure Description." 9th Int. Conf. on Pattern Recognition, vol. 2, pp. 744–747, Nov. 1988.

Tsujimoto et al. "Understanding Multi–Articled Documents." Proceedings, 10th Int. Conf. on Pattern Recognition, vol. 1, pp. 551–556, Jun. 1990.

Krishnamoorthy et al. "Syntactic Segmentation and Labeling of Digitized Pages from Technical Journals." IEEE Transactions on Pattern Analysis and Machine Intelligence, vol. 15, No. 7, pp. 737–747, Jul. 1993.

Conway. "Page Grammars and Page Parsing. A Syntactic Approach to Document Layout Recognition." Proceedings, 2nd Int. Conf. on Document Analysis and Recognition, pp. 761–764, Oct. 1993.

Saitoh et al. "Document Image Segmentation and Text Area Ordering." Proceedings, 2nd Int. Conf. on Document Analysis and Recognition, pp. 323–329, Oct. 1993.

G. Nagy, S. Seth and S. Toddard, "Document analysis with an expert system," Pattern Recognition in Practice II, Gelsema and L. Kanal, editors, North Holland, Amsterdam, 1986: 149–159.

Fu, "Syntactic Pattern Recognition Application," Springer–Verlog, Berlin (1977).

Fahmy and Blostein, "A Graph Grammar Programming Style for Recognition of Music Notation," Machine Vision and Applications, vol. 6 (1993).

Bunke, "Attributed Programmed Graph Grammars and Their Application to Schematic Diagram Interpretation," IEEE Trans, Pattern Analysis and Machine Intelligence, vol. 4, No. 6 (Nov. 1982).

G. Nagy, J. Kanai, M. Krishnamoorthy, M. Thomas and M. Viswanathan, Two Complementary Techniques for Digitized Document Analysis, Sante Fe, New Mexico, Dec. 1988, pp. 169–176.

R. Haralick. Document image understanding: geometric and logical layout. Proc. IEEE Conf. On Computer Vision and Pattern Recognition, 1994: 385–390.

L. O'Gorman, "The document spectrum for bottom–up page layout analysis," Advances in structural and syntactic pattern recognition, Ed. H. Bunke, Singapore: World Scientific, 1992: 270–279.

H.S. Baird, "Background structure in document images," Advances in structural and syntactic pattern recognition, Ed. H. Bunke, Singapore: World Scientific, 1992: 253–269.

(List continued on next page.)

*Primary Examiner*—Jon Chang
*Attorney, Agent, or Firm*—Duane C. Basch

[57] ABSTRACT

The present invention is a method for bottom-up recognition of tables within a document. This method is based on the paradigm of graph-rewriting. First, the document image is transformed into a layout graph whose nodes and edges represent document entities and their interrelations respectively. This graph is subsequently rewritten using a set of rules designed based on apriori document knowledge and general formatting conventions. The resulting graph provides a logical view of the document content. It can be parsed to provide general format analysis information.

22 Claims, 16 Drawing Sheets

OTHER PUBLICATIONS

T. Pavlidis and J. Zhou, "Page segmentation by white streams," Proc. 1st Int. Conf. on Document Recognition, Saint–Malo, 1991: 945–953.

A. Antonacopoulos and R.T. Ritchins, "Flexible page segmentation using the background," Proc. 12th Int. Conf. On Pattern Recognition, 1994: 339–344.

R. Ingold and D. Armangil, "A top–down document analysis method for logical structure recognition," Proc. 1st Int. on Conf. On Document recognition, Saint–Malo, 1991: 41–49.

J. Fisher, in "Logical structure descriptions of segmented document images," Proc. 1st Conf. On Document recognition, Saint–Malo, 1991: 302–310.

D. Niyogi and S. Srihari, "Using domain knowledge to deriver the logical structure of documents," SPIE vol. 2660: 114–125.

M. Viswanatha, E. Green and M.S. Krishnamoorthy, "Document Recognition: An Attribute Grammar Approach," SPIE vol. 2660: 101–111.

M. Armon Rahgozar and Robert Cooperman, "A graph–based table recognition system," Webster, New York.

European Patent Application; Publication No. 677 817 A2; Al–Hussein, Hussein; *Page Segmentation and Character Recognition System*.

Unaudited Quarterly Results

| | From Continuing Operations | | Income (Loss) Before Extraordinary Item and Cumulative Effect | Net Income (Loss) | Income (Loss) Before Extraordinary Item and Cumulative Effect | Net Income (Loss) |
|---|---|---|---|---|---|---|
| | Sales and Revenues | Gross Profit | | | | |
| | *In thousands of dollars* | | | | *Per Share of Common Stock* | |
| 1988 | | | | | | |
| 1st | $ 189,602 | $ 87,795 | $(35,539) | $(35,539) | $(0.87) | $(0.87) |
| 2nd | 318,193 | 161,154 | (44,558) | (44,558) | $(1.04) | $(1.04) |
| 1987 | | | | | | |
| 1st | $ 174,122 | $ 81,232 | $(27,696) | $ (9,390) | $ (.70) | $ (.24) |
| 2nd | 258,045 | 126,839 | (59,590) | (70,756) | $(1.43) | $(1.70) |
| 3rd | 444,236 | 283,532 | 75,506 | 75,506 | $ 1.21 | $ 1.21 |
| 4th | 221,604 | 113,237 | 95,207 | 95,142 | $ 1.36 | $ 1.36 |
| YEAR | $1,098,007 | $604,840 | $ 83,427 | $ 90,502 | $ 1.19 | $ 1.34 |
| 1986 | | | | | | |
| 1st | $ 115,698 | $ 52,019 | $ (7,465) | $ (7,465) | $ (.22) | $ (.22) |
| 2nd | 182,221 | 98,181 | 10,916 | 10,916 | $ .31 | $ .31 |
| 3rd | 279,938 | 170,678 | 58,147 | 58,147 | $ 1.51 | $ 1.51 |
| 4th | 199,843 | 104,247 | 8,877 | 8,877 | $ .23 | $ .23 |
| YEAR | $ 777,700 | $425,125 | $ 70,475 | $ 70,475 | $ 1.91 | $ 1.91 |

NOTES TO UNAUDITED QUARTERLY RESULTS ~280  ~281

1. Sales and revenues and gross profit disclosures above have been restated to reflect results from continuing operations.
2. The cumulative effect of the change in accounting for certain prepublication costs is reflected as if the change occurred in the first quarter of 1987 ($0.46 per share for that quarter). The first quarter of 1987 includes a pretax charge of $15,206,000 for the relocation of HBJ's insurance operations to Orlando, Florida. The second quarter of 1987 includes nonrecurring expenses associated with the Recapitalization Plan of $98,947,000, as well as an extraordinary loss (net of tax) of $11,231,000 on repurchase of debentures ($0.27 per share). The fourth quarter of 1987 reflects the gain on disposal of discontinued operations ($2.28 per share).
3. Results for the third quarter are substantially higher than other quarters owing to the seasonal pattern of prevailing educational buying practices and because attendance is greatest in the summer months at Sea World's marine parks. In addition, 1987 and 1988 contained the results of operations of HRW/WBS, which were acquired in December of 1986. These operations are typical of other HBJ educational publishing, which normally incur losses in the first six months.

SUMMARY OF TIFF READER CAPABILITY
K5200/SCANWORX
R Rico 2/3/92

This is a brief summary of the K5200/ScanWorX TIFF reader requirements. This is not a specification. The reader complies with TIFF version 5.0. This summary is an outline of capability. For a more complete definition of TIFF and its tags refer to the tiff specification.

MANDATORY TAGS

These tags must be present.

| TAG#(HEX) | NAME | TYPE | VALUE |
|---|---|---|---|
| 256(100) | ImageWidth | short/long | image width (pixels) |
| 257(101) | ImageLength | short/long | image length (rows) |
| 273(111) | stripOffsets | short/long | offsets of strips |

OPTIONAL TAGS

If the tags in this section are present they will be used. If they are not present and there is a default defined then the default will be used. Under the "VALUE" column a brief description, defaults or forbidden values will be listed. For a more complete description refer to the TIFF 5.0 spec. (specifically TIFFB).

| TAG#(HEX) | NAME | TYPE |
|---|---|---|
| 254(FE) | NewSubfileType | long |
| 255(FF) | SubfileType | short |
| 258(102) | BitsPerSample | short |
| 259(103) | Compression | short |

| VALUE |
|---|
| general file type |
| DEFAULT = 0 |
| older version of tag 254 |
| for backward compatibility |
| bits per sample |
| DEFAULT = 1 |
| must only equal 1 (TIFFB) |
| type of compression |
| VALID VALUES: |
| 1 = none |
| 2 = Group3 |
| 3 = Group3 fax |
| 4 = Group4 |
| 32773 = PackBits |
| DEFAULT = 1 (no compression) |

METHOD FOR GRAPH-BASED TABLE RECOGNITION

This invention relates generally to a method for recognizing tables within a document, and more particularly to a system for document structure recognition based on a graph rewriting paradigm and including of four subsystems, namely segmentation, graph construction, entity recognition and graph rewriting.

BACKGROUND AND SUMMARY OF THE INVENTION

The present invention is directed to a method for document structure recognition based on a graph rewriting paradigm. Document recognition is a process by which the information regarding the organization of the document content, i.e. its structure, is extracted from the document image. The structure identifies document entity types (e.g. paragraphs, figures and tables), their properties (e.g. the number of columns in a table), and their interrelations (e.g., a figure is above a caption). Although Optical Character recognition (OCR) is an inherent part of this process, it is not intended as an aspect of the present invention. The present invention is directed to document structure recognition beyond a character level. Indeed, the methodology presented here is equivalently applicable to any of a number of document types, including documents described by a Page Description Language (PDL) such as Postscript™ or Xerox Interpress™.

Graphs are known to be powerful tools for document structure analysis. They provide a compact computational abstraction for representing the complex multidimensional information embedded in a document structure. In this abstraction, document entities and the inter-relations between these entities can be represented by elements of graphs, namely graph nodes and links respectively. Manipulation of these nodes and links results in a change in the topology of the graph that consequently provides a new interpretation of the document structure. As a result, the tools for graph manipulation become the basis for a computational document structure analysis framework.

The use of graphs for document recognition has classically been limited to academic and experimental systems due to the computational complexity of graph manipulation. A notable exception is the work of Fahmy and Blostein "A Graph Grammar Programming Style for Recognition of Music Notation, " Machine Vision and Applications, Vol. 6 (1993). This work provides a comprehensive computational framework for document recognition. Fu, in "Syntactic Pattern Recognition Application," Springer-Verlog, Berlin (1977), used graph grammars and syntactic pattern recognition for recognizing Chinese characters. Similarly, Bunke employed line-drawing techniques for understanding in "Attributed Programmed Graph Grammars and Their Application to Schematic Diagram Interpretation, " IEEE Trans. Pattern Analysis and Machine Intelligence, Vol. 4, No. 6 (November 1982).

On the other hand, the present invention is directed to a computationally feasible technique for manipulating the graph of document images. Although the goal of the proposed system is to recognize table structures in a document, it is extensible to encompass a variety of document recognition tasks.

Heretofore, other document analysis methods have been disclosed, the relevant portions of which may be briefly summarized as follows:

R. Haralick. Document image understanding: geometric and logical layout. *Proc. IEEE Conf. On Computer Vision and Pattern Recognition,* 1994: 385–390 teaches page layout analysis processes and text block segmentation. Geometric layout analysis, also termed bottom-up analysis, extracts whatever structure can be inferred without reference to models of particular kinds of pages—e.g., letter, memo, title page, table, etc. Intuitively, this is the structure that would be apparent even to an illiterate person. Also, it is the structure common to pages of all kinds. Logical structure analysis classifies a given page within a repertoire of known layouts, and assigns functional interpretations to components of the page based on this classification. Geometric analysis is generally preliminary to logical structure analysis.

Component aggregation or clustering methods that assemble homogeneous regions from individual connected components subject to size similarity and proximity constraints were described by L. O'Gorman, "The document spectrum for bottom-up page layout analysis," *Advances in structural and syntactic pattern recognition,* Ed. H. Bunke, Singapore: World Scientific, 1992: 270–279. Background structure methods detect bands of white space (gutters) in the image and treat these as the boundaries of text blocks as described by H. S. Baird, "Background structure in document images," *Advances in structural and syntactic pattern recognition,* Ed. H. Bunke, Singapore: World Scientific, 1992: 253–269; T. Pavlidis and J. Zhou, "Page segmentation by white streams," *Proc. 1st Int. Conf. On Document Recognition,* Saint-Malo, 1991: 945–953; and A. Antonacopoulos and R. T. Ritchins, "Flexible page segmentation using the background," *Proc. 12th Int. Conf On Pattern Recognition,* 1994: 339–344.

Top-down logical structure analysis processes do attempt to distinguish types of text, but do so using a priori layout models as taught, for example, by G. Nagy, S. Seth, and S. Stoddard, "Document analysis with an expert system," *Pattern Recognition in Practice II*, E. Gelsema and L. Kanal, editors, North Holland, Amsterdam, 1986: 149–159; and R. Ingold and D. Armangil, "A top-down document analysis method for logical structure recognition," *Proc. 1st Int Conf. On Document recognition,* Saint-Malo, 1991: 41–49.

J. Fisher, in "Logical structure descriptions of segmented document images," *Proc. 1st Int Conf On Document recognition,* Saint-Malo, 1991: 302–310, describes a rule-based system that identifies geometrical and logical structures of document images. Location cues, format cues and textual cues (OCR) are employed to make identifications and transformations during the identification of text and non-text regions.

In accordance with the present invention, there is provided a graph-based method for recognizing tables present in a document represented as digital image data, including the steps of:

segmenting the digital image data to identify textual and image entities within the document;

building a layout graph of the document using the entities;

subsequently tagging each of the text entities with a label from a document node alphabet to produce a labeled graph;

manipulating the text entities of the labeled graph, using at least one rewriting rule, to identify the document structure One aspect of the invention is based on the discovery of techniques for computationally feasible graph-based analysis of document structure. Such techniques are preferably associated with optical character recognition software products to enable users to accurately segment images having textual content therein.

The techniques build a layout of graph from the segmented blocks of the document, capture the geometric relations between the blocks, tags the individual blocks with a set of primitive labels, and uses a set of rules to rewrite the layout graph. The output of the method being another graph whose entities are constructed by merging the primitive entities in the layout graph. The system works primarily by using geometric cues and the text content of the document is not used. The techniques can be implemented with a machine that is capable of running OCR software. For example, a machine implementing the invention can include a personal computer workstation of similarly powered computer.

Another aspect of the invention deals with a basic problem in graph-based analysis—that of providing computationally feasible methods for document analysis in real-time and on computing platforms that are commonly available to users. Increased system efficiency is accomplished by extending the grammar productions to encompass various low-level entity recognition tasks which in turn increases the completeness and generality of the system at the cost of increased parsing complexity.

The technique described above is advantageous because it is computationally efficient is, therefore, inexpensive compared to other approaches. In addition, it can be used to in conjunction with OCR software to provide increased robustness in image segmentation and the improved character recognition that results from such segmentation.

BRIEF DESCRIPTION OF THE DRAWINGS

FIG. 8 is a bitmap image of an exemplary document and FIG. 9 is a representation of the document of FIG. 8 having each entity therein identified by a surrounding box;

FIG. 12 is a bitmap image of an exemplary document including two tables and FIG. 13 is a representation of the document of FIG. 12 having each entity therein identified in accordance with the present invention;

Figure 1:
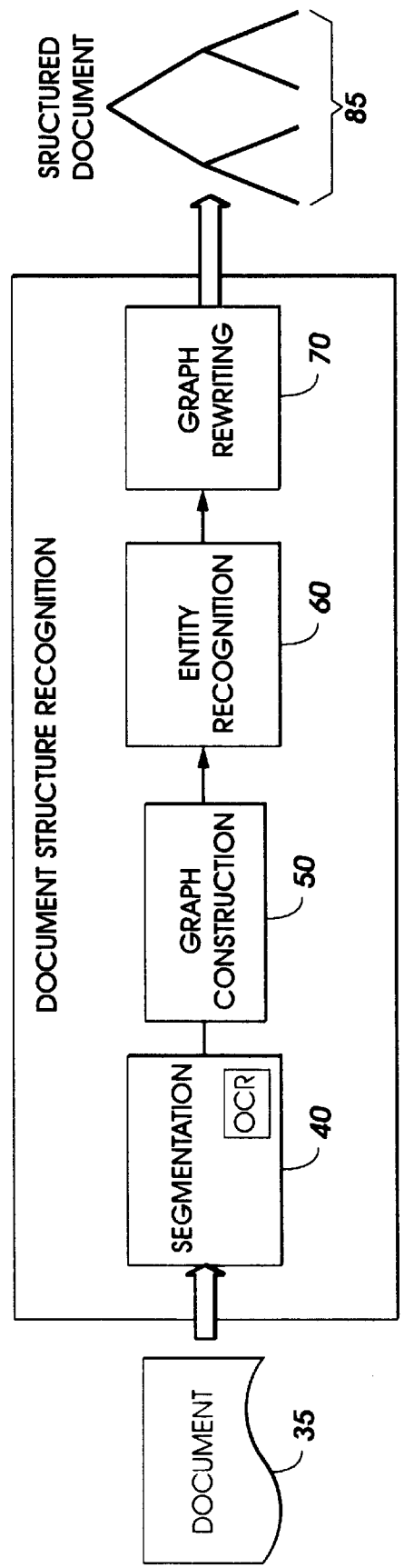
FIG. 1 is a simplified block diagram of a document recognition system in accordance with the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1"and "0"or "ON" and "OFF" or "high" and "low." A bit is an "inverse" of another bit if the two bits have different values. An N-bit item of data has one of $2^N$ values.

The term "data" includes data existing in any physical form, and includes data that are transitory or are being stored or transmitted. For example, data could exist as electromagnetic or other transmitted signals or as signals stored in electronic, magnetic, or other form.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions. A signal "requests" or "is a request for" an event or state when the signal can cause occurrence of the event or state.

"Code" means data indicating instructions, but in a form that a processor can execute.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image output device" is a device that can provide output defining an image. A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image. Data "defines" an image when the data includes sufficient information to produce the image, such as by presenting it on a display.

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A "character recognition system" is a system that can operate on an item of data defining characteristics of a character other than its character type to obtain an item of data indicating its character type.

A "word" is a set of one or more characters that is treated as a semantic unit in a language. A "text" is an arrangement of one or more lines of characters; the characters of a text may form words.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "connected component set" or "component set" is a set of connected components that are treated as a unit. A character can therefore be a component set; for example, the letter "i" includes two connected components that are treated as a single character in English components "form" t components "form" the character. A "bounding box" for a character or other component set is a rectangle just large enough to include all the pixels in the component set, and can be specified by coordinates.

An "image output device" is a device that can receive an item of data defining an image and provide the image as output. A "display" is an image output device that provides the output image in human viewable form. The visible pattern presented by a display is a "displayed image" or simply "image."

The remainder of this section is devoted to presenting a formal terminology for describing graphs and a general technique for manipulating graphs based on a set of rules, referred to herein as graph rewriting.

Let $\Sigma$ and $\Delta$ be finite sets of alphabets for node labels and edge labels respectively. A graph $g=\{V,E,f_v,f_E,A\}$ over the set $\Sigma \cup \Delta$ is a 5-tuple where V represents a nonempty finite set of nodes, $E \subseteq V \times V$ represents a finite set of unordered pairs of nodes called edges. $f_v:V \rightarrow \Sigma$ is an injective mapping that assigns a label to each node, $f_E:E \rightarrow \Delta$ is an injective mapping that labels each edge, and A denotes the combined set of node and edge attributes. If $A \neq \phi$, g is called an attributed graph. A subgraph $g_s$ of g is a graph consisting of some nodes of g and all the edges of g that connect those nodes. In document processing applications, $\Sigma$ contains entities such as words, paragraphs and tables, $\Delta$ contains geometric and logical constraints such as left_of( ) and refers_to( ) and A contains attributes such as bounding box and font type.

Graph rewriting is a sequential process where by a subgraph $g_s$ of a host graph g is replaced with another graph $g_r$ at each step. Each replacement step involves three distinct tasks: first, locating a subgraph isomorphic to $g_s$ in g and detaching it from the host graph; next, replacing $g_s$ by a graph isomorphic to $g_r$ and attaching it to the host graph; and finally recomputing the attributes of the new host graph. A formal method for carrying out these tasks is described using graph grammars. The grammatical approach provides the necessary framework for expressing the graph manipulation rules as well as a strategy for controlling the execution of those rules. Graph rewriting is, however, less stringent than the classical grammatical techniques since it does not require the ultimate reduction of the productions into a start symbol. In the following description, the terminology introduced by Rosenberg et al. "Graph Grammars and Their Application to Computer Science," Springer-Verlag, Berlin (1986), hereby incorporated by reference, is employed to formally describe graph rewriting as its application pertains here.

An Attributed Graph Grammar, or AGG, is a five-tuple $\Gamma=\{\Sigma,\Delta, S, P, A\}$ where $\Sigma$ and $\Delta$ are node and edge alphabets respectively and A is the combined set of the node and edge attributes. $\Sigma$ is the union of two disjoint alphabets $\Sigma_T$ and $\Sigma_N$, respectively referred to as terminal and nonterminal alphabets. Terminal entities cannot be decomposed to the constituent parts. $S \in \Sigma_N$ is the grammar start symbol. P denotes a finite set of grammar productions that are of the form $p=(g_l, g_r, \alpha,\beta, \eta)$ where $g_l \in \Sigma_N$ is left-hand side of the production p that is a graph, $g_r$ is the right-hand side of the production that is a graph, and $\alpha$, $\beta$ and $\eta$ are the embedding relation, the attribute transfer function and the application condition for the production respectively. Each relation $\alpha$ for an undirected graph G is a set of elements of the form $\{(\gamma_1,\delta_1,\gamma_3,\gamma_2,\delta_2, \gamma_4): \gamma_1,\gamma_2,\gamma_3,\gamma_4 \in \Sigma; \delta_1,\delta_2 \in \Delta\}$. Also, each attribute transfer function is of the form $\beta:A \rightarrow A$ and each application condition is a constraint of the form $\eta:A \rightarrow T/F$. Starting from S, the set of all the graphs that can be generated by repeated applications of the productions in P is called the language generated by grammar$\Gamma$. If the left hand side of each production is a single nonterminal, the language is said to be context-free.

Let $G_{rem}$ be the remainder graph of G constructed by removing graph $g_l$ and all the edges connecting to it from G. Assuming the condition $\eta$ is satisfied for the production p, the rewriting step can be defined as follows: First, $g_l$(or a graph isomorphic to $g_l$) is replaced with $g_r$(or a graph isomorphic to $g_r$). Next, $g_r$ is glued into $G_{rem}$ using the embedding relation $\alpha$ in the following manner: An edge with label $\delta_1$ that connects a node $v_2 \in g_l$ with label $\gamma_2$ to a node $v_4 \in G_{rem}$ with label $\gamma_4$ is replaced by an edge with label $\delta_1$ that connects a node $v_1 \in g_r$ with label $\gamma_1$ to a node $v_3$ $G_{rem}$ with label $\gamma_3$. The new graph G' constructed as such is said to have been derived from G using the production p, $$G \xrightarrow{p} G'.$$

Finally, the node attributes for all the nodes in G' are calculated using the functions$\beta$. The derivation process can be continued until all the nodes remaining in the graph belong to the terminal alphabet $\Sigma_T$.

Given a graph G and a grammar$\Gamma$, parsing is the task of determining whether G belongs to the language generated by $\Gamma$. There are two general parsing strategies. In bottom-up parsing, G is reduced to the start symbol S by reverse application of the productions in P whereas in top-down parsing symbol S is expanded by forward application of the production in P until graph G is generated. Bottom-up parsing requires the replacement of each subgraph $g_r$ in G by a graph $g_l$. Locating a subgraph $g_r$ (or a subgraph isomorphic to it) in G is a NP-complete problem commonly known as subgraph isomorphism, i.e. its solution is computationally expensive. Top-down parsing is as computationally expensive since generally backtracking will be needed when there are productions in P that have the same left-hand side. Parsing can become more complicated if it is required to find a best solution amongst a set of possible parses. Indeed, this is the case if the underlying grammar Γ is ambiguous, i. e. more than one sequence of the productions can generate the same graph. This is often true in document recognition applications where there are many possible ways to generate an entity, e. g. a table, from a set of related data.

To parse efficiently, restrictions are typically placed on the underlying grammar. A common type of restriction is the use of application conditions. The languages generated as such are known as controlled languages. Application conditions are used to limit the complexity of the search in the host graph by restricting the number of nodes or edges that are considered. For example, color or font attributes can restrict the search area for locating headings and captions. Prioritizing the production set based on the informal knowledge of the application domain is another method of reducing the complexity of parsing. The grammars that explicitly maintain an ordering of their productions are known as ordered grammars. By assigning higher priorities to the productions that describe more typical behaviors in an application, the parsing algorithm attempts to recognize those behaviors when it encounters multiple possibilities in extending the parse. For example, in a document recognition application, it might be desirable to extend the parse horizontally (vertically) first when reading a paragraph (a table). Priorities can also be assigned to the most specific entities in a hierarchical structure. This is most useful when the language is ambiguous. For example, it may be decided if an structure is a list and then decided if a it is a bulletined list or an index list.

Having presented a formal terminology for describing graphs, a new system for document structure recognition based on a graph rewriting paradigm is now disclosed. The preferred embodiment comprises four subsystems or subprocesses, namely segmentation, graph construction, entity recognition and graph rewriting. Referring to FIG. 1, displayed therein is an block diagram of a system implementing the present invention. It will be further appreciated that the present invention preferably operates on a programmable data processing system. A data processing system capable of executing code for carrying out the various processes of the present invention includes, for example a PC-based system having at least the capability of an Intel™80386 processor, at least 4 Megabytes of RAM and operating Windows™3.1 or higher. The order of operations is as follows: first, at process 40 the segmentation subsystem identifies textual and image document parts; then, the graph construction module 50 builds the layout graph of the document using the segmented parts; next, at process 60 the entity recognition subsystem tags each of the text parts with a label from the document node alphabet; and finally, at process 70 the graph rewriting system identifies the document structure 85 by manipulating the entities of the labeled graph. The input to the system is a document 35 that may be a scanned raster or PDL document image.

The grammatical basis in design of this system lends itself to a modular architecture that enables the interplay between the entity recognition and graph rewriting subsystems. This interplay can be manipulated toward increased system efficiency based on the observation that while extending the grammar productions to encompass various low-level entity recognition tasks increases the completeness and generality of the system at the cost of increased parsing complexity, confining them to a limited set of high-level rewriting tasks increases the complexity of the entity recognized at the cost of less manageable overall control strategy. By providing an abstraction and a set of well defined interfaces that enable this interplay, it is possible to provide a control strategy that allows an external recognition module to carry out the same task as a grammar production. This allows for use of various advance recognizers within a controls modular architecture. In the remainder of this section, each of the above subsystems is discussed in more detail.

The segmentation subsystem, a set of segmentation modules, divides the document image into contiguous areas of text, line-drawings, images and halftones. Even though there are no restrictions placed on the segmentation modules, the output of this stage is required to be a list of nonoverlapping entities. These entities make up the nodes of the input graph for the rewriting system and each will be labeled by a different character of the rewriting alphabet as discussed below. Each entity is required to have a bounding box. Other attributes such as font type in case of text, curve type in case of a line-drawing, or color map in case of an image can be associated with each entity by the segmentation modules. The text output of the segmentation subsystem is allowed to be at different levels of granularity for different entities. Thus, it is most often the case that the segmentation output list contains a mix of individual characters, word fragments, lines and entire text blocks. In addition, since the present invention is intended to deal primarily with raster text input, the system preferably allows for an OCR module to provide the actual text content prior to text entities. As will be shown, this attribute is not necessary. The required segmentation list output format and the suggested attributes can also be extracted from a PDL input. This allows for a uniform treatment of all document images beyond some elementary preprocessing stages.

Figure 2:
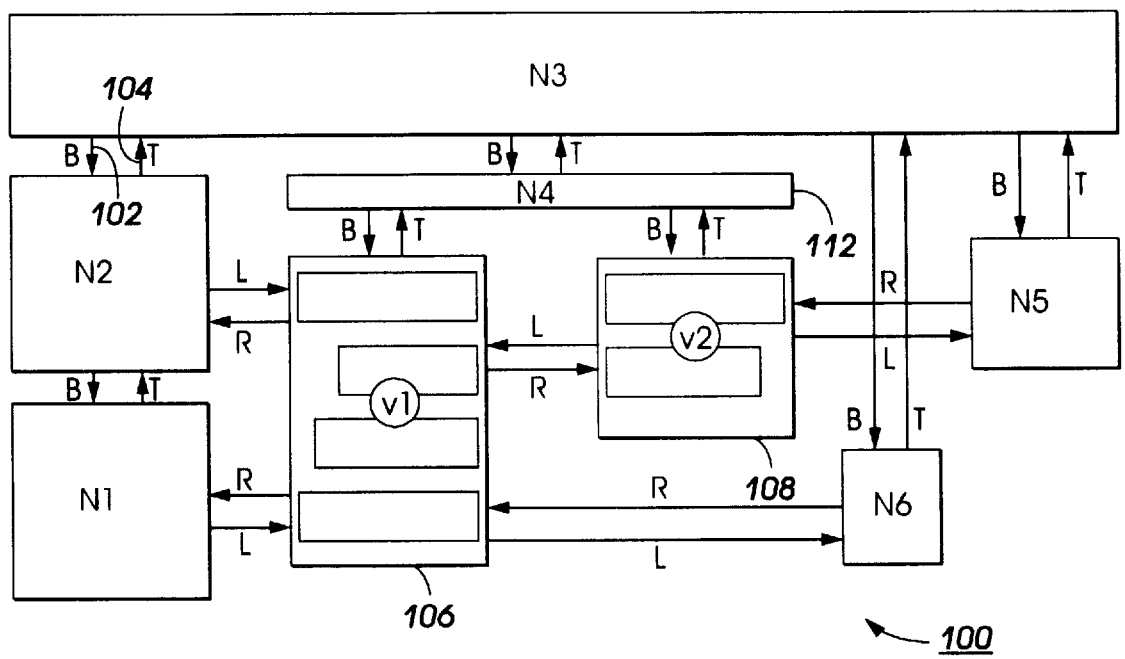
FIG. 2 is a layout graph of an exemplary document.

The input graph for the rewriting subsystem is constructed prior to entity labeling. Graph nodes are constructed using the entities from the previous stage. Graph edges are constructed based on establishing a set of geometric relations between entity bounding boxes. For the initial graph, an edge is constructed between a pair of nodes if any of the four relations left_of( ), right_of( ), top_of( ), or bottom_of( ) holds between the two. Referring to FIG. 2, depicted therein is a typical document layout graph 100, where the relations are represented by symbols L, R. B, and T. For example, entities N1 and N2 have the relations B, represented by reference numeral 102, and T, represented by reference numeral 104. Each node in this graph keeps track of its neighbors on each side in an ordered list. Moreover, provisions are made to deal with imperfections of segmentation. The computational complexity of the graph construction is on the order of $n^2$ where n is the number of the entities.

Prior to graph rewriting, document entities are labeled. The output of the segmentation subsystem identifies two fundamental layout entities, i.e., text regions and image regions. The entity recognition subsystem further refines the text regions' labels according to their size. These entities comprise the initial document alphabet; they are: {C, W. L, TR, IR}, where C, W, L, TR and IR respectively represent a character, a word, a line, a text region and an image region. These entities obey a hierarchical structure as shown in FIG. 3.

Figure 3:
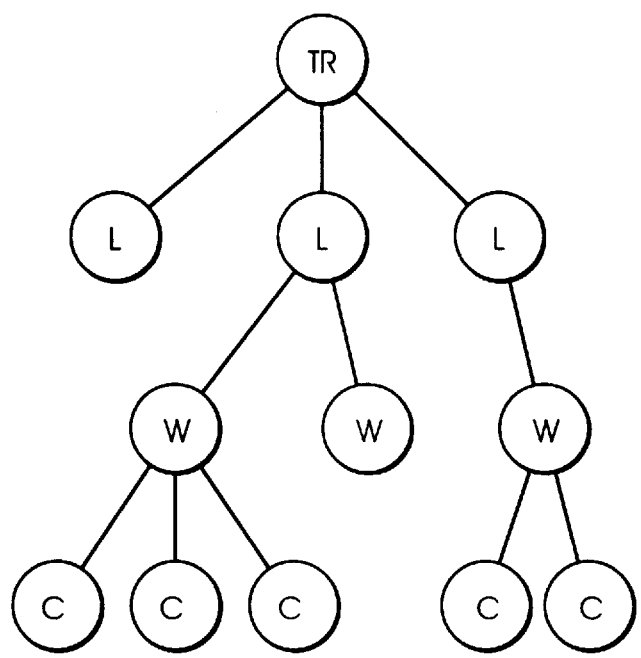
FIG. 3 is an illustration of the hierarchical structure of a document.

The hierarchical entity structure of FIG. 3 is well suited for a grammatical reconstruction. Indeed, there are rules in the current system that enable the construction of an entity from its constituents. However, these rules are only triggered if more efficient external modules for recognizing the same entities are not available. This concept, namely making provisions for an external module to carry out the same task as intended by a grammar production, is present throughout the recognition system of the present invention. This allows for a powerful abstraction and a resulting modular architecture. For example, when there is a highly efficient liner module, an algorithm that can line up characters into lines directly and bypass the word recognition stage, it replaces the grammar rules for building lines. The system presented here is intended to take advantage of many existing external modules in its architecture.

In addition to the above refinement, the entity recognition subsystem classifies the text regions according to their logical identity. This classification produces the additional entity labels {P, COL, TAB, IDXL, JT, UT} where P, COL, TAB, IDXL, JT, and UT respectively represent paragraph, column structure, tabular structure, indexed list, jagged text and unformatted text region. These seven labels further refine and replace the layout label TR (text region) in the earlier alphabet; thus resulting in a pre-rewriting document alphabet that contains {C, W, L, P, COL, TAB, IDXL, JT, UT, IR}. The above classification is done using external modules that are designed using linear and second order statistics as well as neural networks.

An object of the graph rewriting subsystem in the present invention is the extraction of the logical structure of a document from its layout graph. As explained previously, the directed layout graph is generated following a segmentation operation. In this section, the rewriting system is discussed in terms of its four constituents: 1) production rules, 2) embedding functions, 3) attribute transfer functions, and 4) application conditions. Next, a scheme for controlling the rewriting system is presented, where the scheme is dependent on the application order of the rules.

Figure 4:
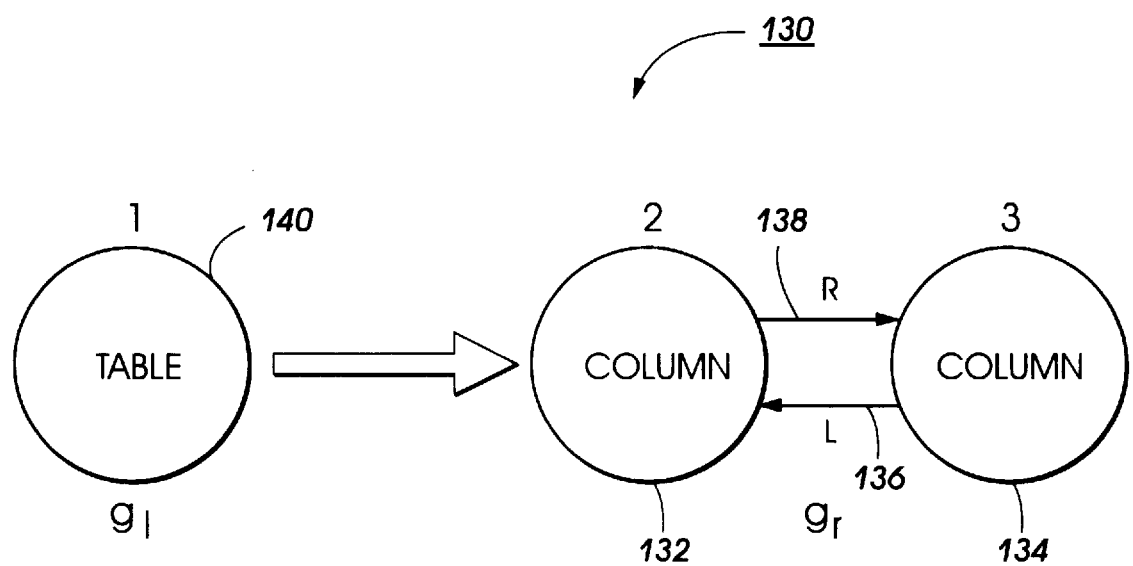
FIG. 4 is an exemplary rewrite rule for constructing a table from two columns in accordance with an aspect of the present invention.

Each rewriting production rule, of the form $g_l \rightarrow g_r$, specifies an ordered pair of graphs where the ordering implies that an isomorphic instance of the subgraph $g_r$ in a host graph can be replaced with an isomorphic instance of the graph $g_l$. For example, consider the rewrite rule depicted in FIG. 4. Referring to FIG. 4, rewrite rule 130 states that an occurrence of a graph of the form represented on the right hand side of FIG. 4, where it contains two nodes 132 and 134 with column labels and two directed edges between the two nodes with labels left (136) and right (138), can be replaced in a host graph with an occurrence of a nonterminal labeled table (140). This rule is said to be context-free since the left-hand side of the production only contains a nonterminal. An application of this rule to the layout graph of FIG. 2 is shown in FIG. 3.

Figure 5:
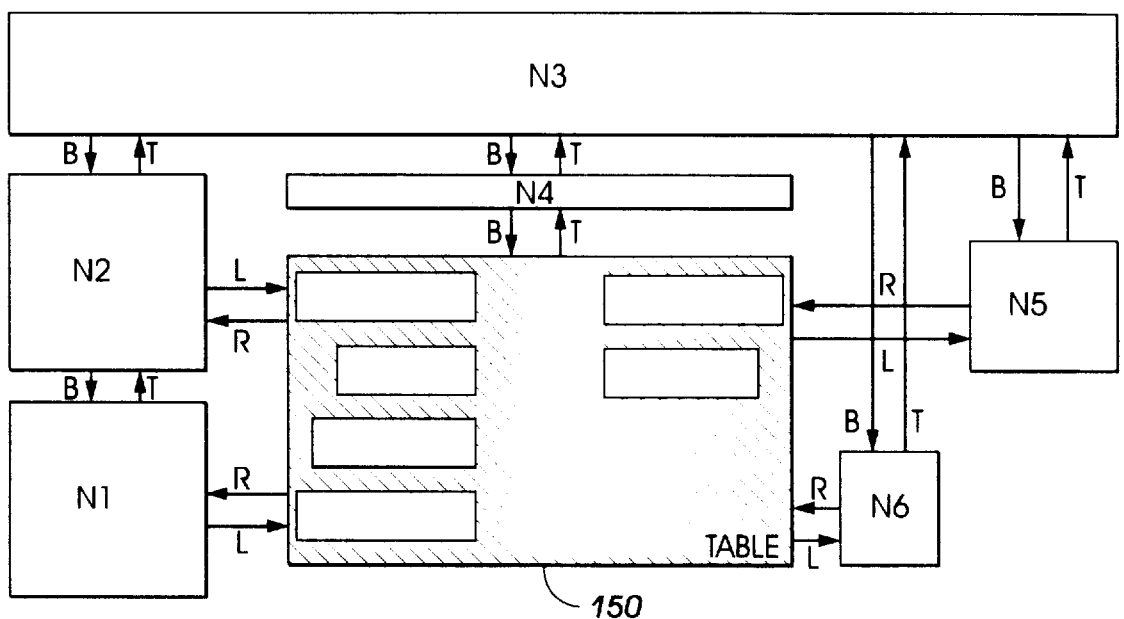
FIG. 5 is a layout graph depicting the results of applying the rewrite rule of FIG. 4 to the graph of FIG. 2 in accordance with the present invention.

Referring now to FIG. 5 in conjunction with FIG. 2, the node 150 labeled table in FIG. 5 replaces the graph representing two adjacent columns (106 and 108) in FIG. 2 as follows: first a search is made to locate a single node $v_1$ that has a column label in the host graph of FIG. 2, then the left, L, and the right, R, edges of $v_1$ are identified, if another node $v_2$ with a column label adjacent to either edge (the left-hand side of the FIG. 4 is symmetric) exists, the entire subgraph containing $v_1$, $v_2$, and the adjoining L and R edges is cut off from the host graph and is replaced with the node 150 labeled table. To complete the rewrite, the replacement node needs to be connected to the remaining host graph using the embedding relations and its attributes need to be calculated. These remaining steps are discussed in the following sections.

Figure 6:
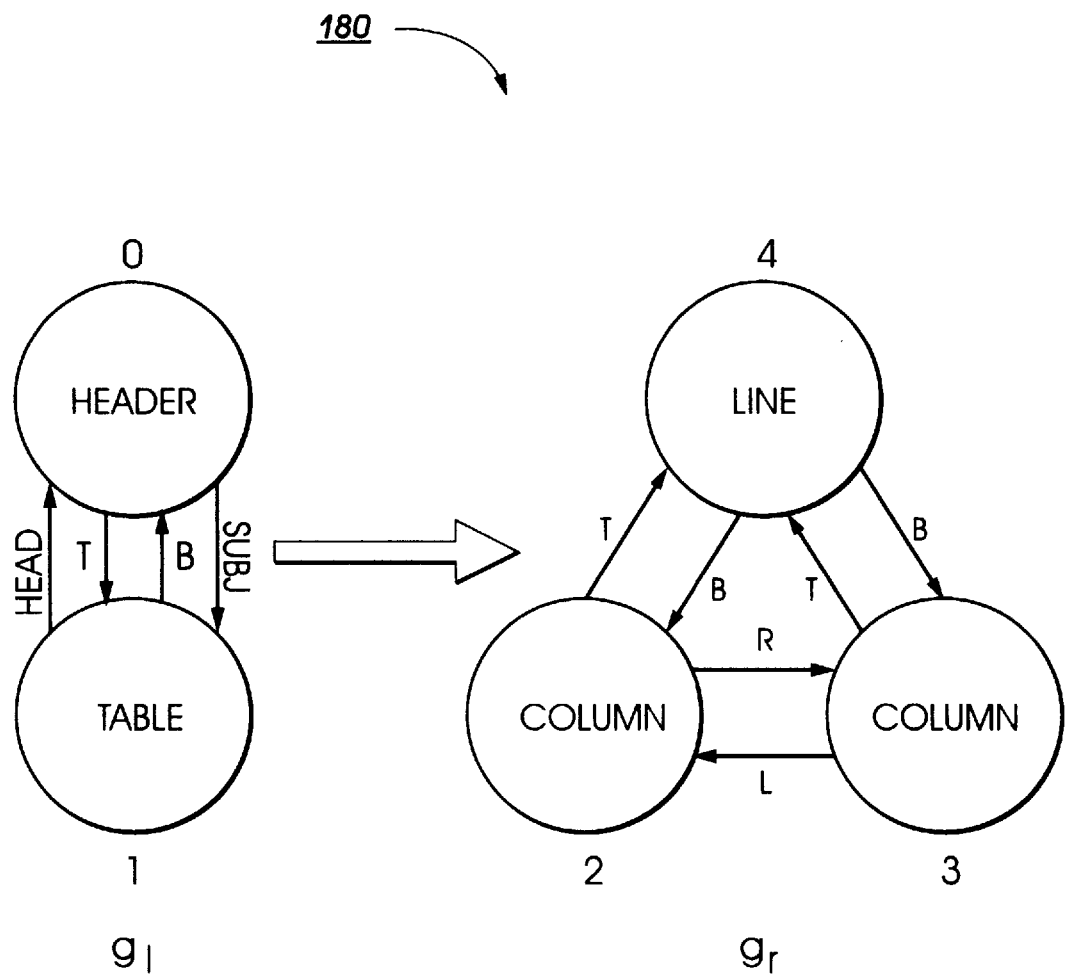
FIG. 6 is another exemplary rewrite rule for constructing a table from two columns and assigning a HEADER label to a line entity.
Figure 7:
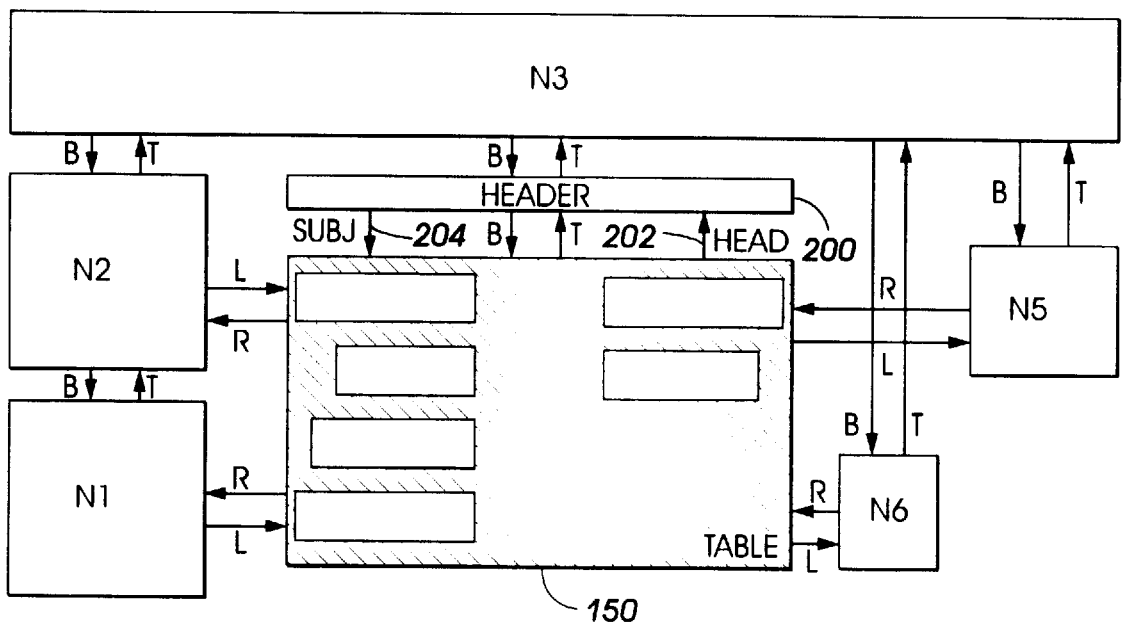
FIG. 7 is a layout graph illustrating the application of the rewrite rule of FIG. 6 to the graph of FIG. 2.
Figure 9:
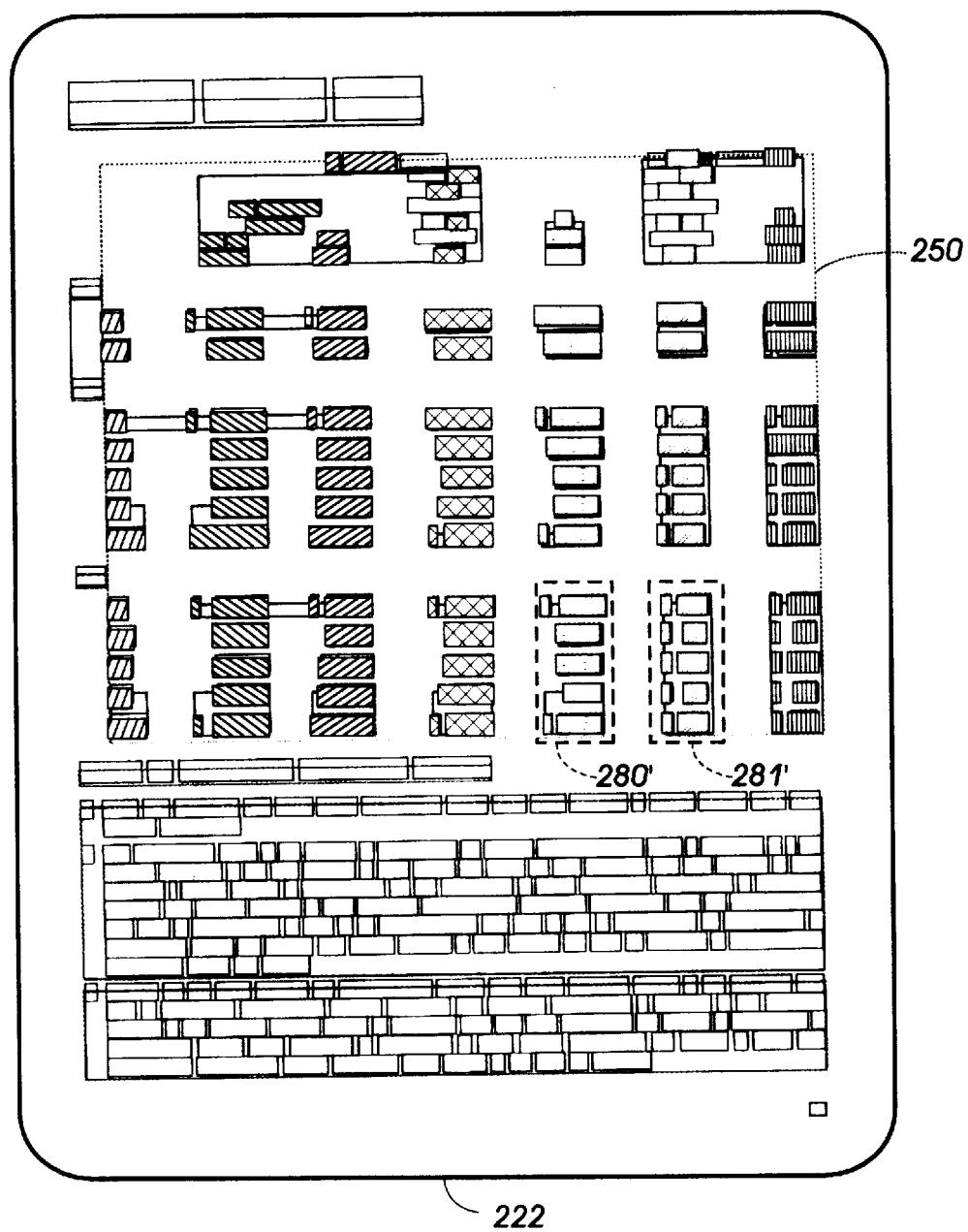

A rewrite rule can also be used to label the entities in the host graph and provide additional edges. These rules are typically denoted as context-sensitive. For example, referring to FIGS. 6 and 7 in conjunction with FIG. 2, an application of the rewrite rule 180 illustrated in FIG. 6 to the host graph of FIG. 2 results in assigning the logical label of HEADER to node N4 as depicted in FIG. 7 by reference numeral 200. Two additional edges, HEAD (202) and SUBJ (204), are also added the host graph providing logical inferences between the TABLE (150) and HEADER (200) entities.

Figure 14:
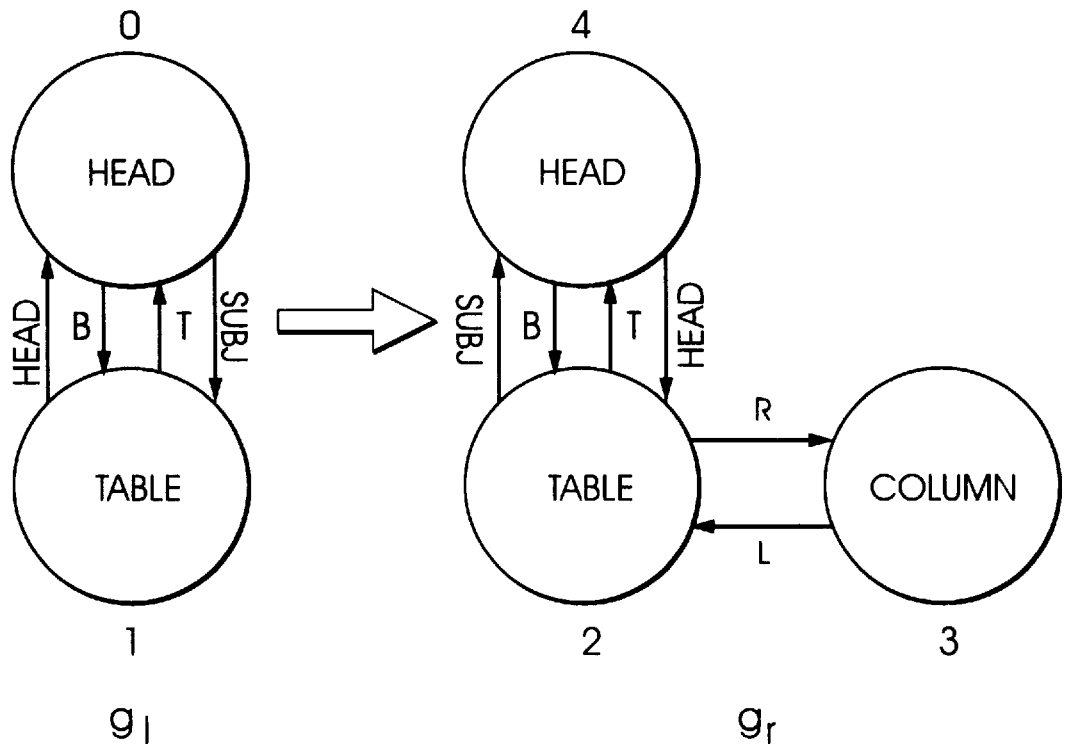
FIGS. 14–16 are illustrations of additional exemplary rewrite rules associated with Rules 3–5 as found in the Appendix.
Figure 15:
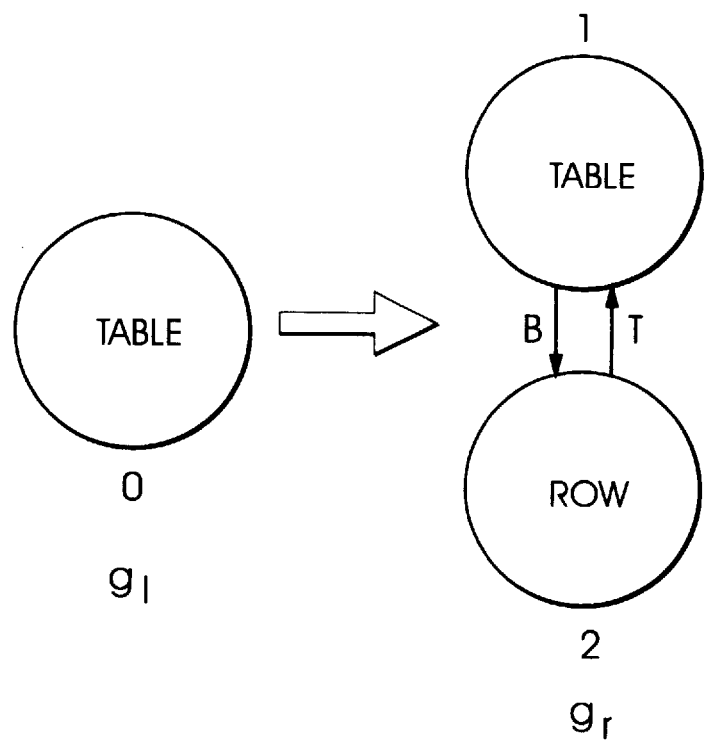
Figure 16:
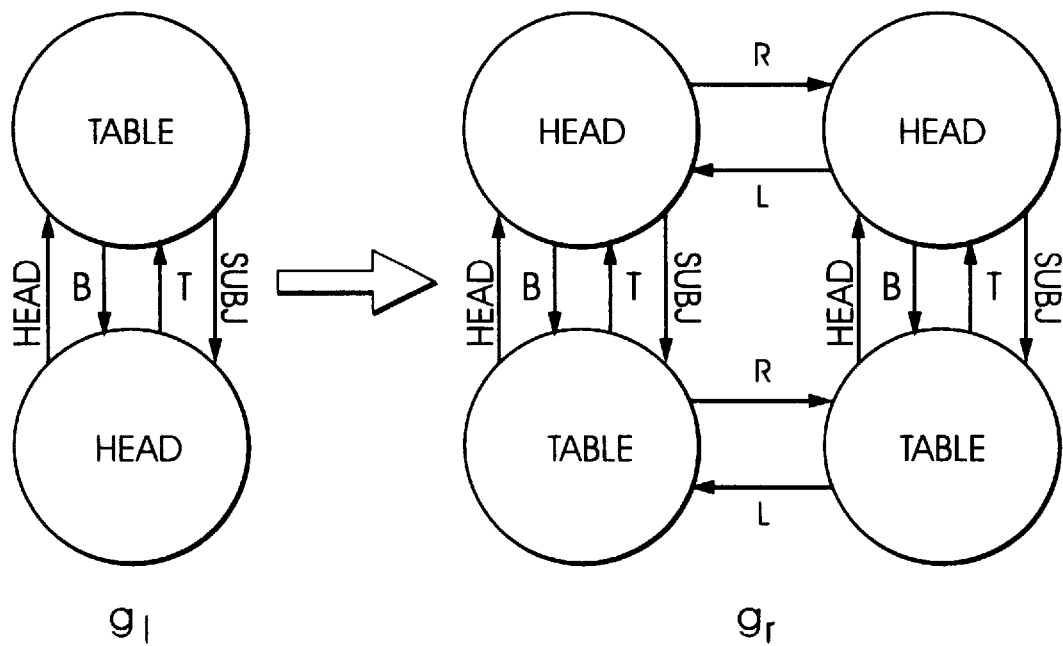

An exemplary set of rewrite rules that may be used in the current system are listed in in the following description and in Appendix A. The following description is directed to a discussion of exemplary Rules 1 and 2, whereas Rules 3–5 are included in the Appendix and are understood to be read in conjunction with FIGS. 14–16, respectively.

The embedding relations associated with each rewrite rule $g_l \rightarrow g_r$ specify how the new subgraph $g_l$ is connected to the remainder graph of the host graph G, i e. $G_{rem}$, after $g_r$ is removed. Using the notation developed earlier, the set of embedding relations associated with each rule can be partitioned in two, IN and OUT, each containing five-tuples of the form $(\gamma_1, \delta_1, \gamma_3, \gamma_2, \delta_2, \gamma_4)$.

Referring again to FIG. 4, consider the embedding for the rewrite rule 130:

OUT = {(2, L, *, 1, L, *), (3, L, $\bar{2}$, 1, L, $\bar{2}$), (2, R, $\bar{3}$, 1, R, $\bar{3}$),    Rule 1

(3, R, *, 1, R, *), (2∪3, T, *, 1, T, *), (2∪3, B, *, 1, B, *)}

IN = {(2, L, $\bar{3}$, 1, L, $\bar{3}$), (3, L , *, 1, L, *), (2, R, *, 1, R, *), (3, R, $\bar{2}$, 1, R, $\bar{2}$), (2∪3, T, *, 1, T, *), (2∪3, B, *, 1, B, *)}

The set operators ∪, ∩, *, and ⁻, with implied logical definitions of EITHER, EACH, ANY, and NOT respectively, have been used in the above expressions to make the representation compact. Each embedding relation is interpreted by establishing a correspondence between the node labels in the host graph G and the vertices indicated in the rewrite rule. For instance, the first OUT embedding relation, i. e. (2, L, *, 1, L, *), in view of the application of the above rule to the host graph of FIG. 2 is interpreted as follows: First a subgraph isomorphic to the right-hand side of the rule is located in the host graph. This is indicated by the shaded area in FIG. 5. Next, a correspondence is made where the vertex labels 2 and 3 in the above rule expressions represent host graph nodes $v_1$ and $v_2$ respectively as illustrated in FIG. 2. Then, (2, L, *, 1, L, *) indicates that any outgoing edge with label L from the vertex $v_1$, i.e. 2, of the g, in the host graph to any node, i. e. *, of the remainder graph $G_{rem}$ should be replaced by a new edge with label L from node 1 of $g_l$ (i. e. the new node in the host graph with label TABLE) to that same node. An example of this embedding relation is the replacement of the outgoing edge with label L from $v_l$ to N1 in FIG. 2 with the outgoing edge with label L from TABLE to N1 in FIG. 5. Similarly, other relations in expressions 1 and 2 can be interpreted in the same manner. For example, (3, L, $\bar{2}$, 1, L, $\bar{2}$) replaces any outgoing edge with label L from $v_2$ in FIG. 2 with an outgoing with label L as long as that edge is not a directed to node $v_1$ in $G_{rem}$, and in case of(2∪3, T, *, 1, T, *), the outgoing edge T is established once if that edge is directed to a node in $G_{rem}$ from any one of $v_1$ or $v_2$.

Most embedding relations can be partitioned into two distinct parts: one that establishes the geometric and one that establishes the logical relations between the entities. The relations presented for the rewrite Rule 1 of FIG. 4 only manipulated the geometric edges. An example of the type of the embedding relations that introduce logical edges into the host graph is shown by rewrite Rule 2 (reference numeral 180) in FIG. 6.

OUT = {(2, L, *, 1, L, *), (3, L, $\overline{2}$, 1, L, $\overline{2}$), (2, R, $\overline{3}$, 1, R, $\overline{3}$),     Rule 2

(3, R, *, 1, R, *), (2∪3, T, $\overline{4}$, 1, T, $\overline{4}$), (2∪3, T, 4, 1, T∩HEAD,0)

(2∪3, B, 1, B, *), (4, B, $\overline{2∪3}$, 0, B, $\overline{2∪3}$), (4, B, 2∪3, 0, B∩SUBJ, 1), (4, $\overline{B}$, *, 0, $\overline{B}$, *)}

IN = {(2, L, $\overline{3}$, 1, L, $\overline{3}$), (3, L, *, 1, L, *), (2, R, *, 1, R, *), (3, R, $\overline{2}$, 1, R, $\overline{2}$),(2∪3, T, *, 1, T, *),(2∪3, B, $\overline{4}$, 1, B, $\overline{4}$), (4, T, $\overline{2∪3}$, 0, T, $\overline{2∪3}$), (4, $\overline{T}$, *, 0, $\overline{T}$, *)}

The application of the above rules to the host graph of FIG. 2 introduces two additional logical edges as shown in FIG. 7.

In practice, the rewrite cost of replacing $g_l$ with $g_r$ in the host graph of FIG. 2 can be reduced by rewriting the part of the graph according to the rule 130 in FIG. 4 and then relabelling node N4 to HEADER and inserting additional edges connecting HEADER and TABLE with labels HEAD and SUBJ accordingly. This process is sometimes referred to as gluing in the graph grammar literature. To enable gluing, the sixth and the ninth OUT embedding relations have been introduced in Rule 2.

The application conditions associated with each rewrite rule specify when that rule is applicable. These conditions are typically expressed as constraints or predicates on the node and edge attributes and are typically derived based on a set of common document formatting conventions. The conditions on a rule are checked before the graph is to be rewritten. In the following discussion some of the application conditions used in a preferred embodiment of the system are described.

The single condition that is tested prior to the application of each rule $g_l \rightarrow g_r$ is to maintain the topological integrity of the document graph stated earlier. This condition states that the bounding box of the graph $g_l$ should not overlap with the bounding boxes of any of the nodes in $G_{rem}$. For example, this constraint denies the application of a rule that attempts to rewrite the subgraph containing the nodes $v_1$ (106) and N4 (112) in FIG. 2 since the bounding box of the resulting graph will intersect (overlap) an existing node, i. e. node $v_2$ (108), in the host graph. This rule was designed to avoid the case of overlapping entities in the initial design of the system. This constraint is independent of the node labels and only depends on the geometric attributes of the nodes. The following pseudocode diagram explains how this constraint is represented. Notice that the bounding box of $g_l$ is calculated by an attribute transfer function and is discussed hereafter.

```
single_mergeable(g_l, g_r, G)
    temp_node ← make_node( )
    temp_node→bbox ← g_l→bbox
    temp_node→nearest_neighbor ← g_r→nearest_neighbor
    if overlap (temp_node, temp_node→nearest_neighbor)
        return FALSE;
    return TRUE;
```

Another application condition that imposes a structural constraint on graph rewriting is alignment. This constraint checks whether the text lines in a horizontal merge, or column structures in a vertical merge, are aligned. This is accomplished via a single abstraction that measures the extent of alignments between two sequences of line segments or intervals. The instantiation of this constraint for a horizontal merge deals with the sequence of line-height intervals for the text lines in each node and for a vertical merge deals with the sequence of column-width intervals for the columns in each node. Consider two interval sequences $I_1$, and $I_2$. Let each sequence $I_j$ be defined as:

$$I_j = \{i_{jk} = [a_{jk}, b_{jk}) : a_{jk} < b_{jk} \leq a_{jk+1}, k=0, \ldots, N_j\} j=1,2 \quad \text{Eq. 1}$$

Then, the alignment metric can be expressed in the following manner:

$$\text{alignment\_cos}(I_1, I_2) = \sum_{m=0}^{N_0} \sum_{n=0}^{N_1} \text{cost}(i_{1m}, i_{2n}) \quad \text{Eq. 2,3}$$

$$\text{cost}(i_{1m}, i_{2n}) = \begin{cases} 0 & i_{1m} \subseteq i_{2n}, i_{1m} \supseteq i_{2n} \\ 1 & i_{1m} \cap i_{2n} \neq \phi \end{cases}$$

The symbols ∪ and ⊆ represent the interval operators of overlap and containment respectively. These operators are designed to be statistically robust against document anomalies such as page skew or noise. For example, interval overlaps of a few pixels are disregarded. The containment operator has a higher precedence than the overlap operator in the above formulation. Given the cost metric (alignment—cost, Eq. 2) defined above, vertical and horizontal alignment

```
horizontal_alignment(v_1, v_2)
    if alignment_cost(v_1→lines, v_2→lines)
        return FALSE;
    return TRUE;
and
vertical_alignment(v_1, v_2)
    if alignment_cost(v_1→columns, v_2→columns)
        return FALSE;
    return TRUE;
``` conditions for two graph nodes $v_l$ and $v_2$ can be expressed by the following two functions:

Application conditions can also be designed to check the validity of certain logical combinations. For example, a simple predicate can be constructed that prohibits the merging of graph nodes if any of them is a paragraph. This reaffirms the perception that a paragraph is an atomic document logical entity that does not combine with other document entities. Simple predicates can also be used to identify such entities as figures or halftones that are recognized at previous stages as nonmergeable. These entities, although nonmergeable, can be used in the manner indicated by the rule in FIG. 4 to label other entities.

The attribute transfer functions associated with each rule $g_l \rightarrow g_r$ compute the attributes of the graph $g_l$ based on the attributes of the graph $g_r$ and the host graph G. There are two distinct mechanisms for transferring attributes: inheritance and synthesis. Examples of inherited types of attributes include font face of the characters and the actual text content of the lines. These attributes can be transferred directly to the word entity made from those characters or the paragraph entity made from those lines. The transfer mechanism in this case is an identity mapping. The synthesized attributes, on the other hand, are constructed using functional mappings. The bounding box of an entity is an example of the type of an attribute that is synthesized. The is following function shows how the bounding box of $g_l$ is constructed for the rewrite rule in FIG. 4.

```
construct_boundingbox(g_l, g_r)
    g_l → lfedge ← MIN (g_r → lfedges)
    g_l → rtedge ← MAX (g_r → rtedges)
    g_l → tpedge ← MIN (g_r → tpedges)
    g_l → btedge ← MAX (g_r → btedges)
    return g_l;
```

The synthesis of other attribute types requires more sophisticated procedures. For example, merging of two interval sets is required in order to construct the column structure of a TABLE entity. For the rewrite rule shown in FIG. 4, this reduces to adjoining two line intervals. However, when two tables are combined vertically, a more general procedure is used to construct the resulting column structure.

As discussed previously, there are two principal strategies for controlling the graph rewriting process: application conditions and ordering of the productions. The present invention utilizes both capabilities. The following three considerations are taken in designing the control strategy. First, the order of the productions is horizontally biased. In other words, if a horizontal rule is applicable, it will be used prior to any vertical rule. This bias was designed based on empirical knowledge that most tables obey the horizontal reading order. Second, if there are any application conditions that are common to a set of productions, they are tested prior to the rule application. Third, whenever possible, parsing is continued at the point of last rewrite in order to minimize the complexity of a search associated with subgraph isomorphism. This is justified since rewriting the graph is what is sought not to minimize the graph to a single start symbol. If parsing cannot be continued at the point of last rewrite, a search is made to locate the next eligible node. To comply with the first consideration, the productions are partitioned into four categories, each corresponding to one of L, R, T or B directions. It is often the case that the same production is in multiple partitions. The combination of above strategies results in the following control mechanism. Let G be a graph and v and v' be nodes, then the top-level control strategy can be expressed as follows:

```
parse(G, v)
    if v' = REWRITE (G, v, left_productions);
    if v' = REWRITE (G, v, right_productions);
    if v' = REWRITE (G, v, top_productions);
    if v' = REWRITE (G, v, bottom_productions);
    else v' = SELECT_NEXT(G)
    parse (G, v');
```

This control strategy is carried through a recursive function that terminates when there are no more rewrites possible. The engine that powers the control mechanism is the REWRITE() function. This function first tests all the common application conditions. These are typically conditions that preserve the structural integrity of the graph and are common to an entire set of productions.

```
rewrite (G, v, production_set)
    /* apply production common application conditions */
    paragraph(v);    return FALSE;
    /* test each production */
    for each production p: g_l → g_r in production_set
        g_r ← instantiate (right_hand (p));
        IF NOT single_mergeable (g_l, g_r, G) return FALS
        /* apply production specific application conditions */
        for each v' in g_r;   IF paragraph (v'); return FALSE
        /* if all conditions are satisfied, rewrite the graph */
        detach (g_r, G);
        embed (g_l, G);
        transfer_attributes (g_l, g_r, G);
        return (g_l);
```

It then goes through an ordered set of productions and rewrites the graph based on the first production that is applicable. This function returns the rewritten node, $g_l$ in the case of a context free grammar, as the point of last rewrite. If $g_l$ is a graph itself, an appropriate node of the rewritten graph is returned. The rewrite function takes advantage of the direction of the actual parse to simplify some of its operations. The following pseudocode represents the rewrite engine:

The rewrite engine starts with testing all the application conditions that are common to all productions. For example, if the node at the point of rewrite is a paragraph, rewrite is aborted. The engine will then go through the ordered set of productions and checks all the production specific conditions. For example, if it is required to check for horizontal or vertical alignment between any two nodes, the test is performed. Finally, if conditions are satisfied, $g_r$ is detached from graph G, $g_l$ is embedded in G, and new attributes are transferred. For example, a bounding box attribute is calculated at this point.

The system proposed herein has been developed and integrated within Xerox TextBridge™ product. Referring to FIGS. 8—13, there are illustrated various sample document images processed in accordance with the present application to recognize tables therein. The shading in the output images (8B,9B and 10B) indicates column structure. In particular, referring to FIGS. 8 and 9, bitmap image 220 contains at least two image regions 280 and 281 representing portions of columns therein. Applying rewrite Rule 1 to regions 280 and 281, the sub-columns (shown as regions 280' and 281' in FIG. 9) are combined into a sub-table and eventually into a table region 250 as depicted in image 222 of FIG. 9. Although the application of rewrite rules as described herein are not specifically illustrated in the TextBridge product during operation, the rewriting operations are executed by the data processing system to identify the regions.

Figure 10:
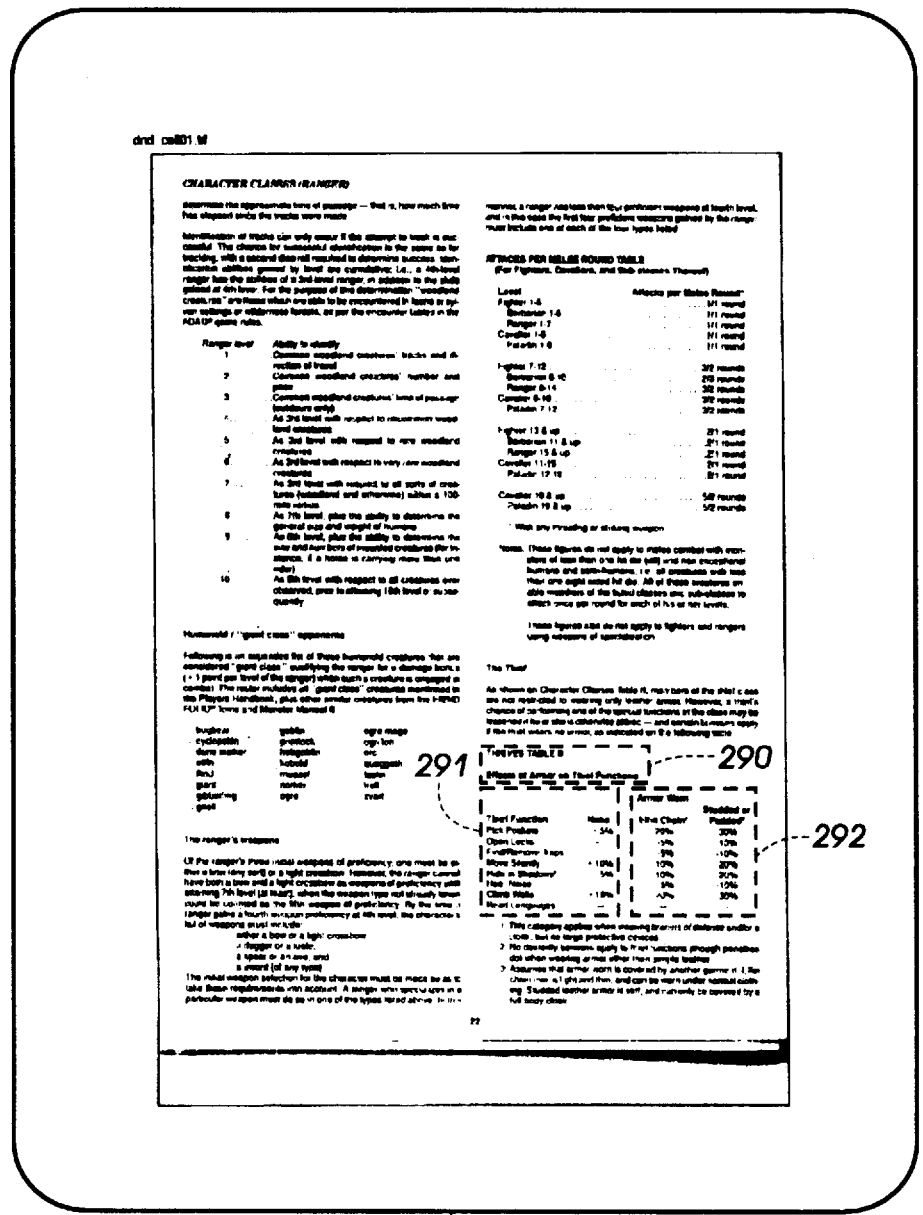
FIG. 10 is a bitmap image of an exemplary document including two tables and FIG. 11 is a representation of the document of FIG. 10 having each entity therein identified in accordance with the present invention.
Figure 11:
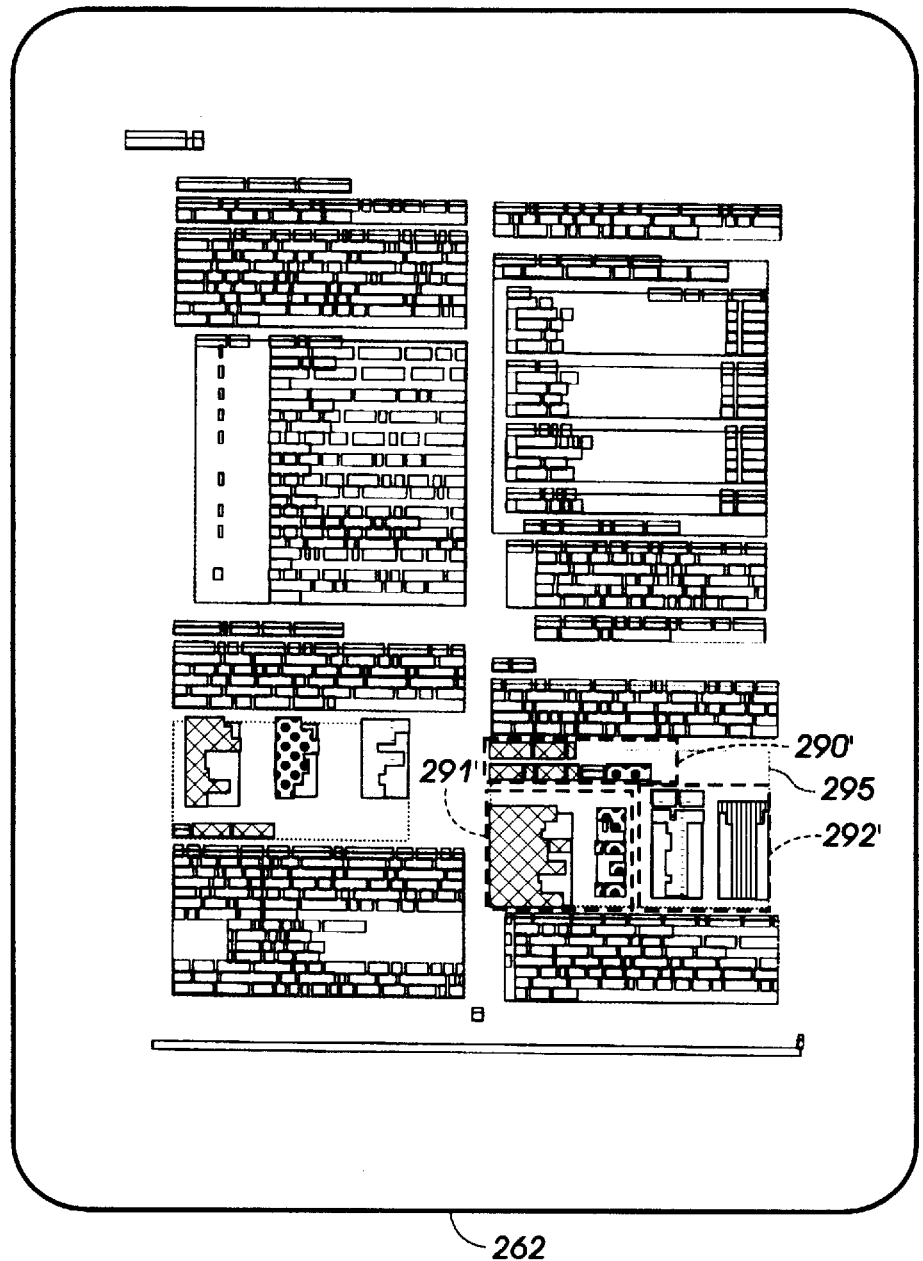
Figure 13:
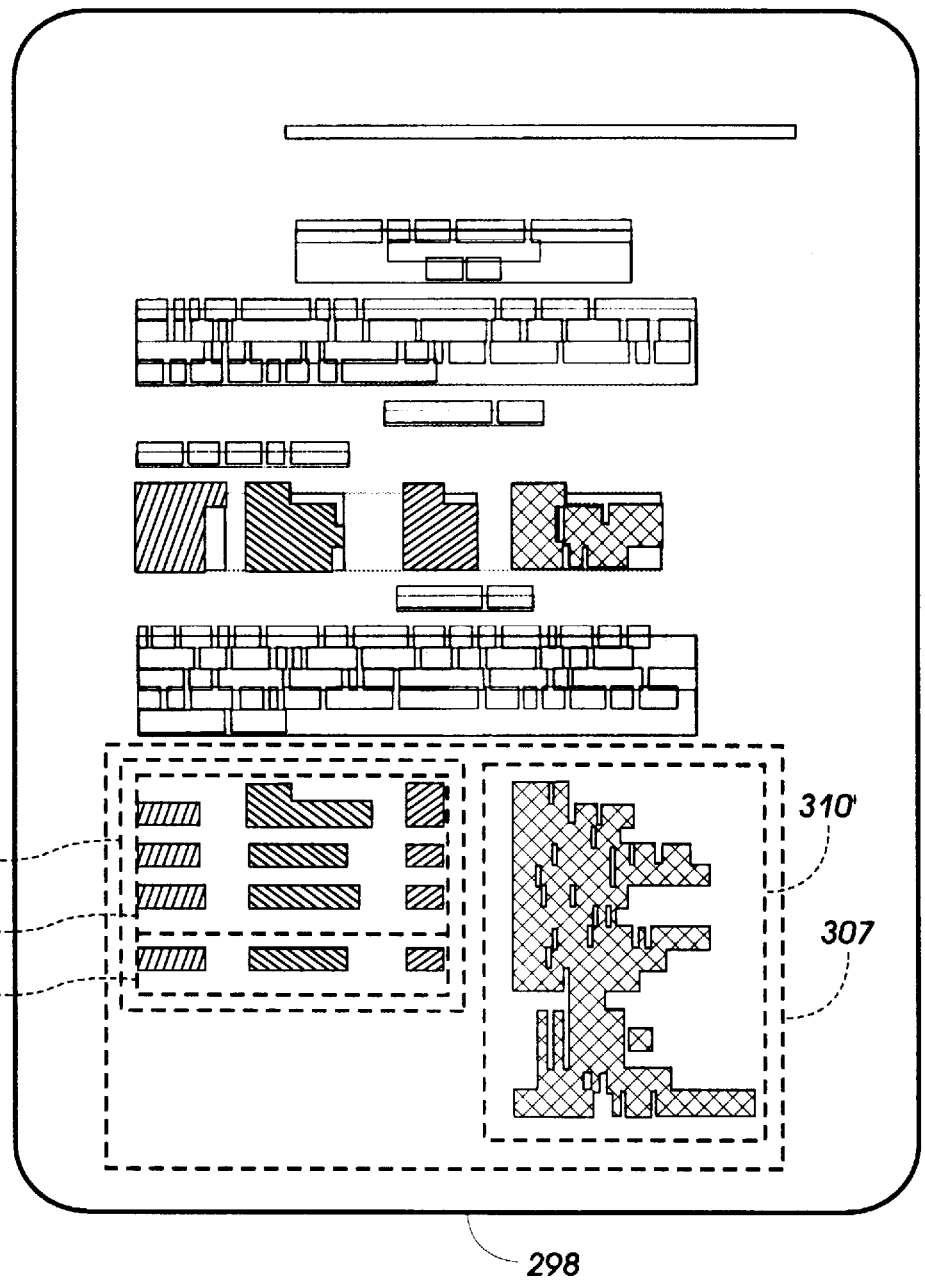

Referring next to FIGS. 10 and 11, depicted therein are images 260 and 262 that are used to illustrate the application of rewrite Rule 5 contained in the Appendix. Specifically, image 260 contains two table regions 291 and 292, and a header region 290. As seen by the representation of the rule in FIG. 16, the table regions 291' and 292' of FIG. 11 are combined with header region 290' to form a larger table region 295. Lastly, FIGS. 12 and 133 illustrate the application of rewrite Rules 3 and 4. Referring to FIG. 12, displayed therein is image 296 having a table region 300 and a row region 301. Applying rewrite Rule 4 to associated regions 300' and 301' in FIG. 13, the two regions are combined into a table 305. Continuing to refer to FIG. 13, by applying rewrite Rule 3, the regions 310 and 307 are combined to form larger region 310.

In recapitulation, the present invention is a method for recognizing tables in documents. It begins by building a layout graph from segmented blocks of a document. The graph captures the geometric relations between the blocks. The present invention then proceeds to tag the individual blocks with a set of primitive of labels. Finally, it uses a set of rules to rewrite the layout graph. The output of this process is another graph whose entities are constructed by merging the primitive entities in the layout graph. The rewrite rules for this process are designed based on document knowledge and general formatting conventions. The system is applicable to a PDL document as well as a raster document with proper preprocessing. The system works primarily by using geometric cues. The text content of the document is not used.

It is, therefore, apparent that there has been provided, in accordance with the present invention, a method for recognizing tables in document images. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

APPENDIX

Rule 3:

$$\text{OUT} = \left\{ \begin{array}{l} (2,L,*,1,L,*), (3,L,\overline{2},1,L,\overline{2}), (3,R,*,1,R,*), (2,R,\overline{3},1,R,\overline{3}), (2\cup 3,B,*,1,B,*), \\ (2\cup 3,T,\overline{4},1,T,\overline{4}), (2,T,4,1,T\cap\text{HEAD},0), (4,T,*,0,T,*), (4,B,2,0,B\cap SUBJ,1), \\ (4,\overline{B},*,0,\overline{B},*) \end{array} \right\}$$

$$\text{IN} = \left\{ \begin{array}{l} (2,L,\overline{3},1,L,\overline{3}), (3,L,*,1,L,*), (2,R,*,1,R,*), (3,R,\overline{2},1,R,\overline{2}), (2\cup 3,B,\overline{4},1,B,\overline{4}), \\ (2\cup 3,T,*,1,T,*), (4,T,\overline{2},0,T,\overline{2}), (4,\overline{T},*,0,\overline{T},*) \end{array} \right\}$$

Rule 4:

$$\text{OUT} = \left\{ \begin{array}{l} (1\cup 2,L,*,0,L,*), (1\cup 2,R,*,0,R,*), (1,T,*,0,T,*), (1,B,\overline{2},0,B,\overline{2}), (2,B,*,0,B,*), \\ (2,T,\overline{1},0,T,\overline{1}) \end{array} \right\}$$

$$\text{IN} = \left\{ \begin{array}{l} (1\cup 2,L,*,0,L,*), (1\cup 2,R,*,0,R,*), (1,T,\overline{2},0,T,\overline{2}), (1,B,*,0,B,*), (2,B,\overline{1},0,B,\overline{1}), \\ (2,T,*,0,T,*) \end{array} \right\}$$

Rule 5:

$$\text{OUT} = \left\{ \begin{array}{l} (2,L,*,1,L,*), (3,L,\overline{2},1,L,\overline{2}), (3,R,*,1,R,*), (2,R,\overline{3},1,R,\overline{3}), \\ (4,L,*,0,L,*), (5,L,\overline{4},0,L,\overline{4}), (5,R,*,0,R,*), (4,R,\overline{5},1,R,5), \\ (2\cup 3,B,*,1,B,*), (2\cup 3,T,\overline{4\cup 5},1,T,\overline{4\cup 5}), \\ (2\cup 3,T,4\cup 5,1,T\cap\text{HEAD},0), \\ (4\cup 5,T,*,0,T,*), (4\cup 5,B,\overline{2\cup 3},0,B,\overline{2\cup 3}) \\ (4\cup 5,B,2\cup 3,0,B\cap SUBJ,1) \end{array} \right\}$$

$$\text{IN} = \left\{ \begin{array}{l} (2,L,\overline{3},1,L,\overline{3}), (3,L,*,1,L,*), (2,R,*,1,R,*), (3,R,\overline{2},1,R,\overline{2}), \\ (4,L,\overline{5},0,L,5), (5,L,*,0,L,*), (4,R,*,0,R,*), (5,R,\overline{4},0,R,\overline{4}), \\ (2\cup 3,B,\overline{4\cup 5},1,B,\overline{4\cup 5}), (2\cup 3,T,*,1,T,*), \\ (4\cup 5,B,*,0,B,*), (4\cup 5,0,T,\overline{2\cup 3}) \end{array} \right\}$$

We claim:

1. A graph-based method for recognizing tables present in a document represented as digital image data, including the steps of:
    segmenting the digital image data to identify textual and image entities within the document;
    building a layout graph of the document using the entities;
    automatically tagging each of the text entities with a label from a document node alphabet to produce a labeled graph;
    automatically rewriting the labeled graph, by manipulating the text entities therein, using at least one rewriting rule, to identify the logical structure of the document, wherein the logical structure includes an identified table and the labeled graph is a host graph and where the step of automatically rewriting the labeled graph by manipulating the text entities comprises the steps of
    identifying at least two entities in the layout graph that are isomorphic instances of subgraphs, and
    replacing, in the host graph, the at least two entities that are isomorphic instances of the subgraphs with a non-terminal entity.

2. The method of claim 1, wherein the segmentation operation identifies as text entities contiguous, non-overlapping regions of text.

3. The method of claim 2, wherein the contiguous, non-overlapping regions of text each have a bounding box identifying the boundaries thereof.

4. The method of claim 3, wherein the step of building a layout graph is based upon a set of geometric relations between entity bounding boxes.

5. The method of claim 4, wherein the geometric relations between entity bounding boxes are stored in a memory as an ordered list.

6. The method of claim 4, wherein the geometric relations between entity bounding boxes results in the construction of an edge whenever a relation therebetween is detected from the group consisting of:
    left of;
    right of;
    top of; and
    bottom of.

7. The method of claim 2, wherein the text entities are selected from at least one of:
    a character;
    a word;

a line; and a text region.

8. The method of claim 7, wherein the text entity group obeys a hierarchical structure, where a character is subordinate to a word;

a word is subordinate to a line; and a line is subordinate to a text region.

9. The method of claim 7, further comprising the step of re-classifying text regions according to their logical identity as one of a plurality of classifications selected from at least one of:

a paragraph;

a column;

a table;

an indexed list;

a jagged text region; and an unformatted text region.

10. The method of claim 1, wherein the step of manipulating the text entities of the labeled graph includes a context-free rewrite rule.

11. The method of claim 1, wherein the step of manipulating the text entities of the labeled graph includes a context-sensitive rewrite rule.

12. The method of claim 1, wherein the nonterminal entity is connected to the remainder of the host graph based upon a set of embedding relations.

13. The method of claim 12, wherein the embedding relations are geometric.

14. The method of claim 12, wherein the embedding relations are logical.

15. The method of claim 12, wherein each rewrite rule has at least one application condition associated therewith.

16. The method of claim 15, further comprising the step of testing the application condition prior to the application of a rewrite rule.

17. The method of claim 16 wherein the application condition requires that a bounding box about the nonterminal entity does not overlap with a bounding box of any of the other entities in the host graph.

18. The method of claim 1 wherein each rewrite rule has an attribute transfer function associated therewith.

19. The method of claim 1 wherein each rewrite rule has a production rule associated therewith.

20. The method of claim 1, further comprising the step of recursively applying the step of manipulating the text entities until no more rewrite rules are applicable.

21. A graph-based method for recognizing tables present in a document represented as digital image data, including the steps of:

segmenting the digital image data to identify textual and image entities within the document;

building a layout graph of the document using the entities;

automatically tagging each of the text entities with a label from a document node alphabet to produce a labeled graph;

automatically rewriting the labeled graph, by manipulating the text entities therein, using at least one rewriting rule, to identify the logical structure of the document, wherein the logical structure includes an identified table and where the rewriting rule comprises a production rule, an embedding function, an attribute transfer functions, and an application condition.

22. An automated document structure recognition system for performing a graph-based method for recognizing tables present in a document represented as digital image data, including:

a segmentation subsystem for segmenting the digital image data to identify textual and image entities within the document;

a graph construction module for building a layout graph of the document using the entities;

an entity recognition subsystem for automatically tagging each of the text entities within the layout graph with a label from a document node alphabet to produce a labeled graph; and a graph rewriting system for automatically rewriting the labeled graph, by manipulating the text entities therein, using at least one rewriting rule, to identify the logical structure of the document, wherein the logical structure includes an identified table, wherein the labeled graph is a host graph and where the rewriting system identifies at least two entities in the layout graph that are isomorphic instances of subgraphs, and replaces, in the host graph, the at least two entities that are isomorphic instances of the subgraphs with a nonterminal entity.

* * * * *